(12) United States Patent
Branigan

(10) Patent No.: US 8,176,274 B2
(45) Date of Patent: May 8, 2012

(54) ELECTRONIC DATA REPRODUCTION

(75) Inventor: Steven Branigan, Tinton Falls, NJ (US)

(73) Assignee: Cyanline LLC, Eatontown, NJ (US)

( * ) Notice: Subject to any disclaimer, the term of this patent is extended or adjusted under 35 U.S.C. 154(b) by 306 days.

(21) Appl. No.: 12/604,390

(22) Filed: Oct. 23, 2009

(65) Prior Publication Data

US 2010/0106902 A1 Apr. 29, 2010

Related U.S. Application Data

(60) Provisional application No. 61/197,288, filed on Oct. 24, 2008.

(51) Int. Cl.
*G06F 12/00* (2006.01)

(52) U.S. Cl. .......... 711/162; 711/114; 711/165

(58) Field of Classification Search .......... None
See application file for complete search history.

(56) References Cited

U.S. PATENT DOCUMENTS

| | | | |
|---|---|---|---|
| 5,701,436 A | 12/1997 | Nagashima et al. | |
| 5,835,954 A | 11/1998 | Duyanovich et al. | |
| 6,058,054 A | 5/2000 | Islam et al. | |
| 6,415,296 B1 | 7/2002 | Challener et al. | |
| 6,654,830 B1 | 11/2003 | Taylor et al. | |
| 2006/0184587 A1 | 8/2006 | Federwisch et al. | |
| 2006/0235847 A1* | 10/2006 | Farlee et al. | 707/7 |
| 2006/0235907 A1 | 10/2006 | Kathuria et al. | |
| 2006/0242370 A1 | 10/2006 | Suzuki et al. | |

FOREIGN PATENT DOCUMENTS

KR 10-2008-0049507 A 6/2008

\* cited by examiner

*Primary Examiner* — Shawn X Gu

(74) *Attorney, Agent, or Firm* — Ash Tankha; Lipton, Weinberger & Husick

(57) ABSTRACT

A computer implemented method and system is provided for reproducing electronic data from a source storage device to a target storage device. The source storage device is connected to the target storage device via a disk interface. The electronic data on the target storage device is configured in a read write mode for electronic data transmission. The amount of electronic data to be reproduced is determined and sequentially read. The read electronic data is transmitted to the target storage device by performing a sequential write operation. The user can examine the transmitted electronic data during the transmission. If an interruption occurs, the electronic data is analyzed and the user selectively resumes the transmission. In the absence of the source storage device, the target storage device is configured in a read only mode for providing read only access to the electronic data present on the target storage device.

12 Claims, 10 Drawing Sheets

ELECTRONIC DATA REPRODUCTION

CROSS REFERENCE TO RELATED APPLICATIONS

This application claims the benefit of provisional patent application No. 61/197,288 titled "Fast Disk Acquisition System, A Method and System for Quickly Copying Electronic Data", filed on Oct. 24, 2008 in the United States Patent and Trademark Office.

BACKGROUND

Electronic data backup is a process of obtaining a copy of electronic data stored on a source storage device, for example, a disk drive such as a hard disk drive, an optical disk drive, a floppy disk drive, etc. The electronic data may be copied to a target storage device from the source storage device. In the event of loss of the electronic data on the source storage device, the electronic data can be restored on the source storage device using the copy of electronic data stored on the target storage device. Electronic data backup finds an application in many fields, for example, the computer forensic field. Forensic acquisition is the process of obtaining a copy of electronic data present on a disk drive and transferring the obtained copy to another disk drive.

In current electronic data backup methodologies, a user initiates the electronic data backup process. On initiation of the data backup process, the source storage device commences reproducing the electronic data on the target storage device. The user cannot access or examine the electronic data during the course of the electronic data transmission. If the user wishes to examine the content of the electronic data that is being transmitted, the user has to examine the data prior to the transmission, terminate the electronic data transmission process or wait till the electronic data transmission process is completed. Consider an example where a user wishes to reproduce a confidential file present on a source storage device onto a target storage device. If the confidential file is of a large volume, and the user wishes to access the content of the confidential file during the process of transmission of the confidential file, the user has to terminate the file transmission process.

In typical electronic data backup methodologies, if an electronic data transmission is interrupted, then that session of transmission of the electronic data is automatically terminated and the electronic data that was being transmitted is automatically erased from the target storage device or left in an incomplete, unusable state. If the user wishes to continue the transmission of electronic data, the user has to reinitiate a new session of transmission of electronic data and the electronic data starts getting reproduced from the initial point and not from the point from where it was interrupted, thus not allowing the use of data transferred to the target storage device.

Current electronic data backup methodologies allow a user to access and modify the electronic data present on the target storage device. For example, if a first user wishes to reproduce a confidential image file from a source storage device to a target storage device, the first user initiates the confidential image file transmission. A second user may access the reproduced confidential image file from the target storage device and tamper with the accessed reproduced confidential image file. Therefore, there is a need for a functionality that allows a user to read the electronic data present on the target storage device but does not allow the user to modify the electronic data on the target storage device.

Hence, there is a need for a computer implemented method and system that allows a user to examine the electronic data being transmitted from a source storage device to a target storage device during the course of the electronic data transmission operation. Moreover, there is a need for a computer implemented method and system that allows the electronic data transmission to be selectively resumed if there is an interruption from the point where the electronic data transmission was interrupted. Furthermore, there is a need for a computer implemented method and system that selectively configures the target storage device to a read only mode, a read write mode, and an erase mode based on the type of access.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for allowing a user to examine the electronic data being transmitted from a source storage device to a target storage device during the course of the electronic data transmission. The computer implemented method and system disclosed herein also allows selective resuming of the electronic data transmission operation if there is an interruption from the point where the electronic data transmission was interrupted or from a point selected by the user. The computer implemented method and system selectively configures the target storage device to a read only mode, a read write mode, and an erase mode based on the type of access.

The computer implemented method disclosed herein comprises: a) connecting a source storage device to a target storage device via a disk interface; b) determining the amount of the electronic data to be reproduced from the source storage device to the target storage device; c) performing a sequential read operation on the determined electronic data present on the source storage device; d) transmitting the read electronic data from the source storage device to the target storage device by performing a sequential write operation on the read electronic data from the source storage device to the target storage device, wherein the transmitted electronic data can be examined by a user during the electronic data transmission; e) monitoring and tracking the electronic data transmission from the source storage device to the target storage device; f) identifying any point of interruption of the electronic data transmission by analyzing the read electronic data on the source storage device and the transmitted electronic data on the target storage device; g) comparing the amount of transmitted read electronic data on the target storage device with the determined amount of the electronic data to be reproduced from the source storage device to the target storage device; and h) selectively resuming the electronic data transmission from the interruption based on options selected by a user; whereby the electronic data is reproduced from the source storage device to the target storage device.

The sequential write operation enables the read electronic data to be transmitted onto the target storage device without modifying the read electronic data on the source storage device. If the source storage device is not connected to the target storage device, the target storage device is configured in a read only mode. No modification of data is allowed on the target storage device.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
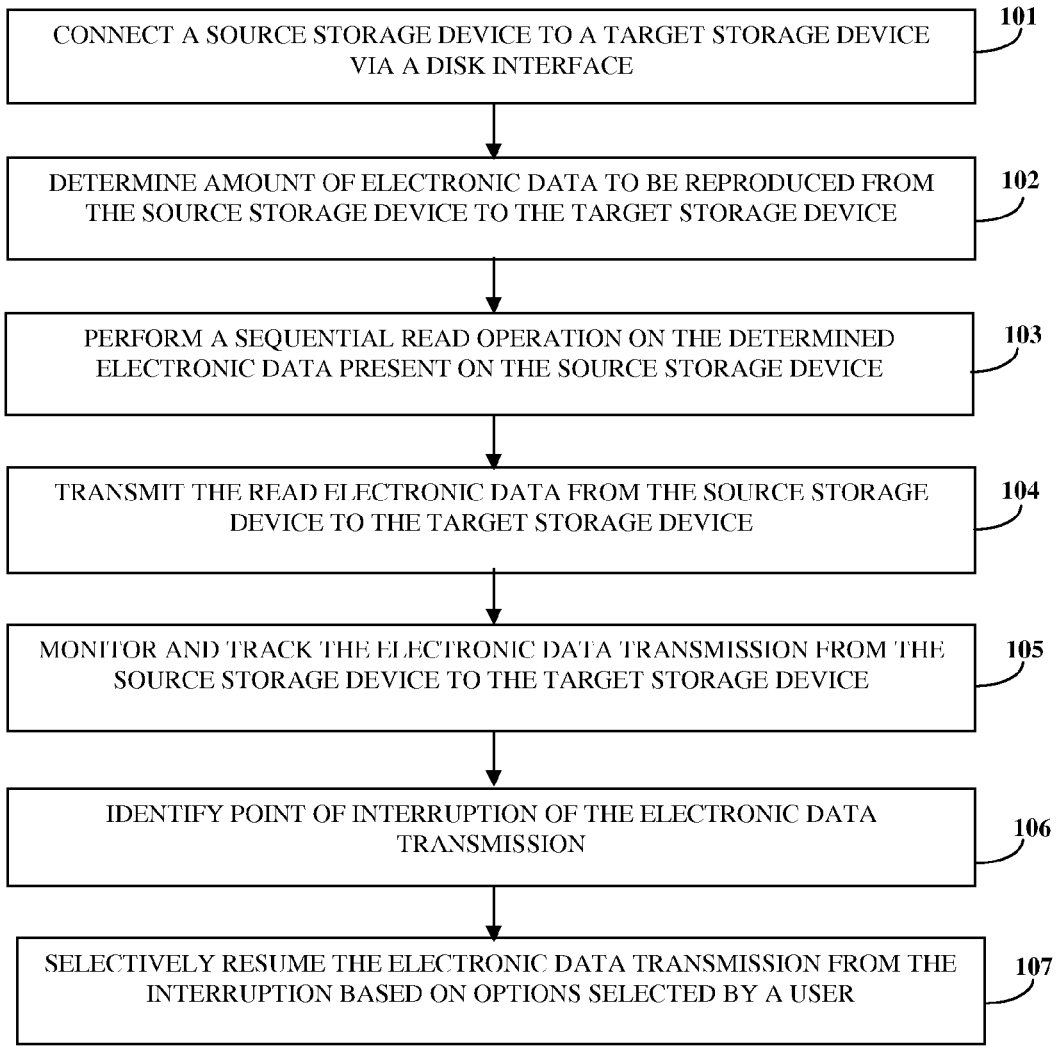
FIG. 1 illustrates a computer implemented method for reproducing electronic data from a source storage device to a target storage device.

FIG. 1 illustrates a computer implemented method of reproducing electronic data from a source storage device to a target storage device. As used herein, electronic data refers to electronic files, electronic documents, etc. The source storage device and the target storage devices are peripheral devices, for example, disk drives, that are used to store and retrieve electronic data. A disk drive is, for example, a hard disk drive.

A source storage device is connected 101 to the target storage device via a disk interface. The disk interface is a point of intersection between the target storage device and the source storage device. The disk interface is, for example, integrated drive electronics (IDE) data cable, a serial advanced technology attachment (SATA) card, a universal serial bus (USB), etc. The source storage device may also be connected to the target storage device through a wired or wireless network configuration. The source storage device may be connected to the target storage device via a network, for example, the internet, through a network interface.

When the source storage device is connected to the target storage device, the target storage device is configured in a read write mode and an erase mode. The read write mode allows a user to reproduce the electronic data present on the source storage device on the target storage device by facilitating sequential writing of electronic data from the source storage device to the target storage device. The read write mode also allows a user to modify the electronic data present on the target storage device. The erase mode allows the user to erase the electronic data present on the target storage device.

In the absence of the connection between the source storage device and the target storage device, the electronic data on the target storage device is made available in read only mode and an erase mode. Data acquired from the source storage device cannot be modified or appended when there is no source storage device is present. The read only mode allows a user to access the electronic data present on the target storage device via a network and does not allow modification of electronic data present on the target storage device. The erase mode allows for removal of the electronic data.

The target storage device is configured as, for example, a redundant array of inexpensive disks (RAID). The RAID divides and replicates electronic data among multiple hard disk drives. There are different levels of RAID architectures, for example, RAID 0, RAID 1, etc. Consider an example where the source storage device is an external hard disk and the target storage device is configured as RAID 0. A RAID 0 architecture is exemplarily illustrated in FIG. 5. RAID 0 uses a method called striping. Striping takes a single chunk of electronic data, for example, a graphic image, and spreads that electronic data across multiple drives, thereby increasing the overall speed of writing data to the target storage device. This method allows about twice the amount of electronic data to be written in a given time frame to multiple drives when compared to that same electronic data being written to a single drive. In an embodiment, the target storage device may also be configured as a single storage unit.

When the source storage device is connected to the target storage device, the amount of electronic data to be reproduced from the source storage device to the target storage device is determined 102. A sequential read operation is performed 103 on the determined electronic data present on the source storage device. The read electronic data is transmitted 104 from the source storage device to the target storage device by performing a sequential write operation on the read electronic data from the source storage device to the target storage device. The sequential write operation enables the read electronic data to be reproduced onto the target storage device without modifying the read electronic data on the source storage device. The electronic data on the source storage device is not altered.

Consider an example where a user initiates the process of reproducing the read electronic data from the source storage device to the target storage device. A copy of the read electronic data is created and the copy of the read electronic data is transmitted to the target storage device. Instantaneously after the copying of the read electronic data is initiated, the copy of read electronic data being reproduced on the target storage device can be accessed by the user. The read electronic data transmitted to the target storage device can be examined by the user during the course of electronic data transmission.

The electronic data transmission from the storage device to the target storage device is monitored and tracked 105. Consider an example where the source storage device is unavailable. If the source storage device is not connected to the target storage device, the target storage device is configured in a read only mode. A user can access the electronic data present on the target storage device via a network but the user will not be able to modify the electronic data.

If there is an interruption during the course of the electronic data transmission, for example, due to a power failure, loss of connection between the source storage device and the target storage device, etc., the point of interruption is identified 106 by analyzing the read electronic data present on the source storage device and the transmitted electronic data on the target storage device.

In an embodiment, the size of determined amount of electronic data present on the source storage device is compared with the size of the transmitted amount of read electronic data present on the target storage device. If the determined amount of electronic data present on the source storage device is equal to the transmitted amount of read electronic data present on the target storage device, then the transmission process is declared complete. If the determined amount of electronic data present on the source storage device is not equal to the transmitted amount of read electronic data present on the target storage device, then the transmission process is declared incomplete. The electronic data transmission is therefore monitored and tracked for identifying the point of interruption.

The user is given options via the GUI to selectively resume 107 the electronic data transmission. The user selects either to resume the electronic data transmission from the identified point of interruption, erase the transmitted electronic data from the target storage device and commence a new session of the electronic data transmission, or resume the transmission of selected parts of electronic data from the source storage device that required immediate transmission. For example, if the user wishes to discard the reproduced read electronic data and start a new session of electronic data transmission, the user can do so by selecting one of the options on the GUI. If the user wishes to resume the electronic data transmission process from the point of interruption occurrence, the user can do so by selecting one of the options on the GUI. The user may further wish to skip transmitting some of the electronic data from the source storage device and resume the transmission of selected electronic data by selecting one of the options on the GUI. The user may also select the time for resuming the electronic data transmission on the GUI.

Consider where electronic data, for example, an electronic file of size 1 megabyte is to be reproduced from a source storage device such as a hard disk to a target storage device, for example, a RAID 0. A sequential read operation is performed on the electronic file. The electronic file is transmitted from the hard disk to the RAID 0 by performing a sequential write operation on the read electronic file. A user initiates the process of reproducing the read electronic file from the hard disk onto the RAID 0. A copy of the read electronic file is generated and the copying process is commenced. The user can access the copy of the read electronic file that is being transmitted. Based on the selection of the user, the corresponding read electronic file is reproduced on the RAID 0.

The user can examine the read electronic file present on the hard disk and examine the reproduced electronic file during the course of electronic file transmission. If an interruption occurs during the transmission of the read electronic file from the hard disk to the RAID 0, the transmission process is temporarily suspended. The determined amount of electronic file present on the hard disk is compared with the transmitted amount of the read electronic file present on the RAID 0. If the determined amount of electronic file present on the hard disk is equal to the transmitted amount of read electronic file present on the RAID 0, then the transmission process is declared complete. If the determined amount of electronic file present on the hard disk is not equal to the transmitted amount of read electronic file present on the RAID 0, then the transmission process is declared incomplete. The read electronic file present on the hard disk and the reproduced electronic file present on the RAID 0 are thus analyzed and the point of interruption is obtained.

Consider an example where an interruption occurs when 50 kilobytes of the electronic file has already been reproduced on the RAID 0 from the hard disk. The user is given options via the GUI to selectively resume the electronic file transmission. If the user wishes to discard the 50 kilobytes of the electronic file that has already been reproduced on the RAID 0, the user selects an appropriate option from the provided options and the 50 kilobytes of the electronic file that has already been reproduced on the RAID 0 is automatically discarded. The user may then commence a new session of the electronic file transmission. If the user wishes to resume the electronic file transmission and transmit the remaining 50 kilobytes of the electronic file present on the hard disk, the user selects an appropriate option from the provided options. The remaining 50 kilobytes of the electronic file present on the hard disk is then transmitted.

Figure 2:
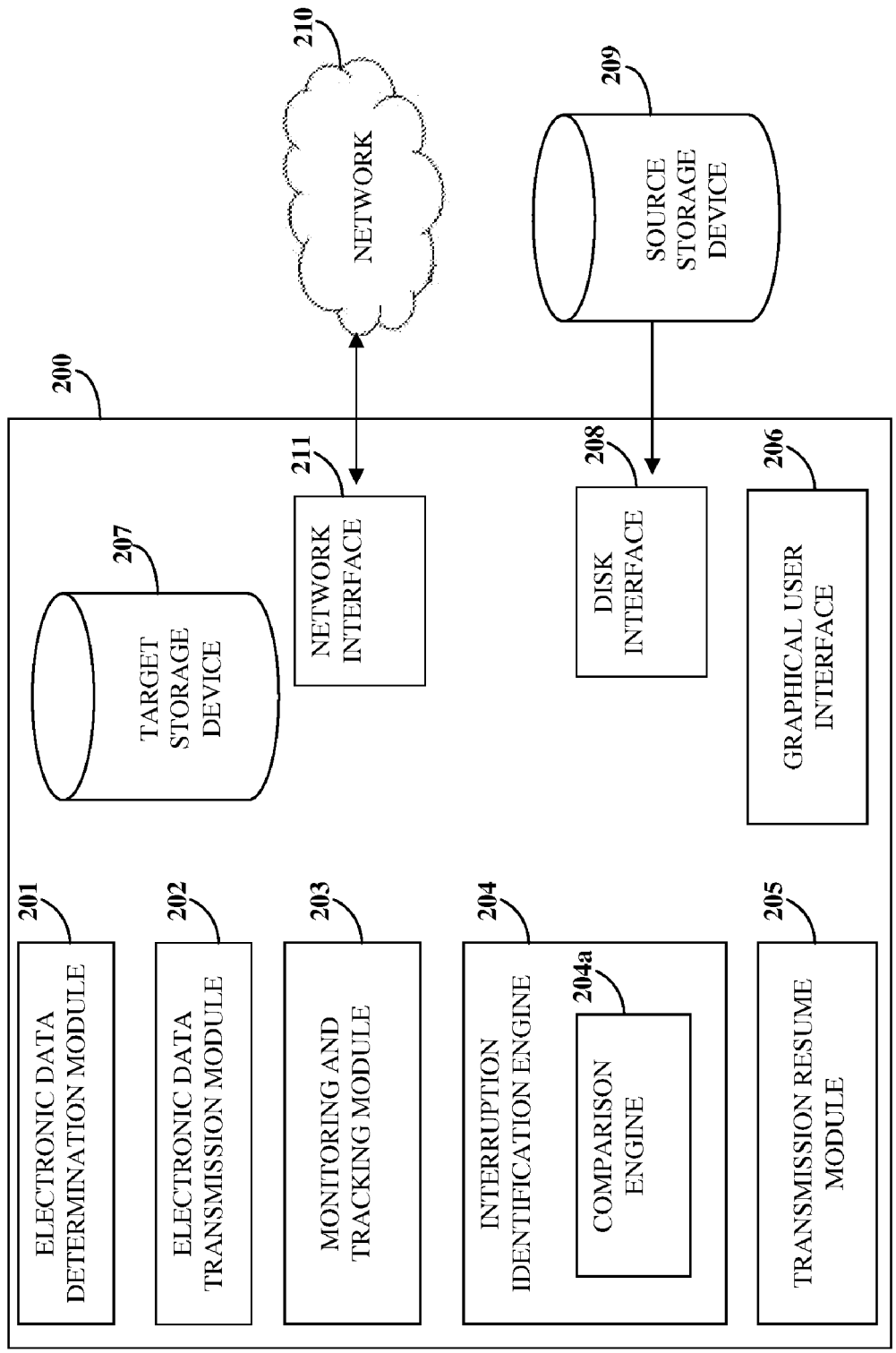
FIG. 2 illustrates a computer implemented system for reproducing electronic data from a source storage device to a target storage device.

FIG. 2 illustrates a computer implemented system 200 for reproducing electronic data from a source storage device 209 to a target storage device 207. The computer implemented system 200 disclosed herein hosts the target storage device 207. The computer implemented system 200 comprises a disk interface 208 through which the target storage device 207 is connected to the source storage device 209. The source storage device 209 may also be connected to the target storage device 207 via a network 210, for example, the internet, through a network interface 211.

The computer implemented system 200 comprises an electronic data determination module 201, an electronic data transmission module 202, a monitoring and tracking module 203, an interruption identification engine 204, a transmission resume module 205, and a GUI 206.

The monitoring and tracking module 203 configures the target storage device 207 in a read only mode, a read write mode, or an erase mode based on type of access. For example, if access of electronic data on the target storage device 207 is attempted via a network 210, the monitoring and tracking module 203 configures the target storage device 207 in a read only mode. If the source storage device 209 is connected to the target storage device 207 via the disk interface 208, the monitoring and tracking module 203 configures the target storage device 207 in a read write mode and an erase mode.

The monitoring and tracking module 203 scans to detect connection of the source storage device 209 to the target storage device 207 via the disk interface 208. If a connection is detected, the monitoring and tracking module 203 configures the electronic data present on the target storage device 207 to be in a read write mode and an erase mode for enabling electronic data transmission from the source storage device 209 to the target storage device 207.

The electronic data determination module 201 determines amount of electronic data to be reproduced from the source storage device 209 to the target storage device 207. The computer implemented system 200 disclosed herein sequentially reads the electronic data from the source storage device 209. The electronic data transmission module 202 transmits the read electronic data from the source storage device 209 to the target storage device 207 by performing a sequential write operation on the read electronic data. The computer implemented system 200 disclosed herein enables a user to modify the copy of read electronic data that is being transmitted. The user is then given options on the GUI 206 through which the user selects either the original copy of read electronic data or the modified copy of the read electronic data to be reproduced on the target storage device 207 based on the preference of the user. The GUI 206 also enables the user to examine the read electronic data during the course of transmission of the read electronic data and displays the status of the electronic data transmission to the user.

The monitoring and tracking module 203 monitors and tracks the transmission of the read electronic data from the source storage device 209 to the target storage device 207 via the network 210. The interruption identification engine 204 identifies the point of interruption and analyzes the read electronic data during the course of transmission of the electronic data. For example, when the computer implemented system 200 is powered on, if a partial copy of the electronic data present on the source storage device 209 is detected on the target storage device 207, the interruption identification engine 204 identifies the partial copy of electronic data.

The interruption identification engine 204 comprises a comparison engine 204a. The comparison engine 204a compares the determined amount of electronic data present on the source storage device 209 with the transmitted amount of read electronic present on the target storage device 207. The point of interruption is obtained by the interruption identification engine 204. For example, the comparison engine 204a compares the partial copy of electronic data present on the target storage device 207 with the electronic data present on the source storage device 209 and obtains the point of interruption. The transmission resume module 205 selectively resumes the electronic data transmission from the interruption based on options selected by the user via the GUI 206. The GUI 206 enables the user to interactively control the reproduction of electronic data from the source storage device 209 to the target storage device 207.

If the target storage device 207 is not connected to the source storage device 209, the monitoring and tracking module 203 configures the electronic data present on the target storage device 207 to be in a read only mode. The user may then access the electronic data present on the target storage device 207 via the network 210.

Figure 3:
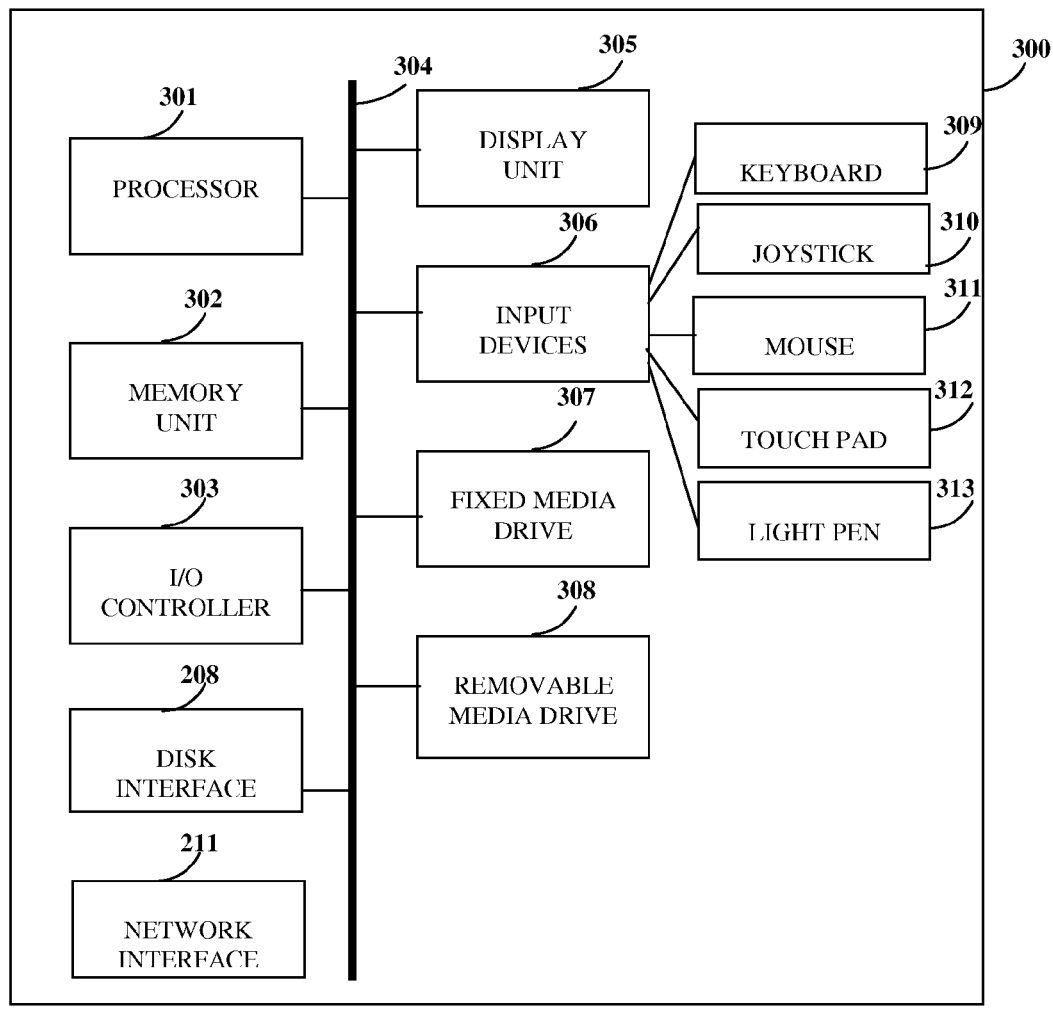
FIG. 3 exemplarily illustrates a computer system employed for reproducing electronic data from a source storage device to a target storage device.

FIG. 3 exemplarily illustrates a computer system 300 employed for reproducing electronic data from a source storage device 209 to a target storage device 207. The source storage device 209 and the target storage device 207 communicate with each other via the disk interface 208. The computer system 300 comprises, for example, a processor 301, a memory unit 302 for storing programs and data, an input/output (I/O) controller 303, an disk interface 208, a network interface 211, a system bus 304, a display unit 305, input devices 306, a fixed media drive 307, a removable media drive 308, etc.

The processor 301 is an electronic circuit that can execute computer programs. The memory unit 302 is used for storing programs and applications. The memory unit 302 is, for example, a random access memory (RAM) or another type of dynamic storage device that stores information and instructions for execution by the processor 301. The memory unit 302 also stores temporary variables and other intermediate information used during execution of the instructions by the processor 301. The computer system 300 further comprises a read only memory (ROM) or another type of static storage device that stores static information and instructions for the processor 301. The disk interface 208 enables connection of the computer system 300 to the source storage device 209. The network interface 211 enables connection of the computer system 300 to the network 210. The I/O controller 303 controls the input and output actions performed by a user of the computer system 300. The system bus 304 permits communications between the modules, for example, modules 201, 202, 203, 204, 204a, 205, and 206 of the computer implemented system 200 disclosed herein.

The display unit 305 displays computed results to the user of the computer system 300. The input devices 306 are used for inputting data into the computer system 300. The input devices 306 are, for example, a keyboard 309 such as an alphanumeric keyboard, a joystick 310, a mouse 311, a touch pad 312, a light pen 313, etc. The computer system 300 further comprises a fixed media drive 307 and a removable media drive 308 for receiving removable media.

Computer applications and programs are used for operating the computer system 300. The programs are loaded into the memory unit 302 of the computer system 300 via the fixed media drive 307 or removable media drive 308. In an embodiment, the computer applications and programs may be loaded directly through the network 210. Computer applications and programs are executed by selecting the appropriate option from the display unit 305 using one of the input devices 306. The user of the computer system 300 interacts with the computer system 300 using a graphical user interface (GUI) 206 of the display unit 305, the network interface 211 or other I/O devices supported by the computer system 300.

The computer system 300 employs an operating system for performing multiple tasks. The operating system is responsible for the management and coordination of activities and the sharing of the resources of the computer system 300. The operating system further manages security of the computer system 300, peripheral devices connected to the computer system 300, and network connections. The operating system employed on the computer system 300 recognizes, for example, source storage device 209 connected to the computer system 300, inputs provided by the user using one of the input devices 306, the output display, files and directories stored locally on the fixed media drive 307, etc. The operating system on the computer system 300 executes different programs initiated by the user using the processor 301. Location of the instructions in the program memory is determined by a program counter (PC). The program counter is a processor register that holds the address of the instruction being executed or the address of the next instruction to be executed.

The instructions fetched by the processor 301 from the program memory after being processed are decoded. After processing and decoding, the processor 301 executes the instructions. For example, the electronic data determination module 201 defines the instructions for determining the amount of electronic data to be reproduced from the source storage device 209 to the target storage device 207. The electronic data transmission module 202 defines the instructions for transmitting the read electronic data from the source storage device 209 to the target storage device 207. The monitoring and tracking module 203 defines the instructions for scanning and detecting connection of the source storage device 209 to the target storage device 207 and also defines the instructions for monitoring and tracking the transmission of the read electronic data. The interruption identification engine 204 defines the instructions for identifying and analyzing an interruption during the course of transmission of the electronic data. The comparison engine 204a defines the instructions for comparing electronic data for analysis of the interruption. The transmission resume module 205 defines instructions for selectively resuming the electronic data transmission via the options provided on the GUI 206, which are stored in the program memory.

The processor 301 retrieves the instructions defined by the electronic data determination module 201, the electronic data transmission module 202, the monitoring and tracking module 203, the interruption identification engine 204, the comparison engine 204a, and the transmission resume module 205 and executes the instructions.

Figure 4A:
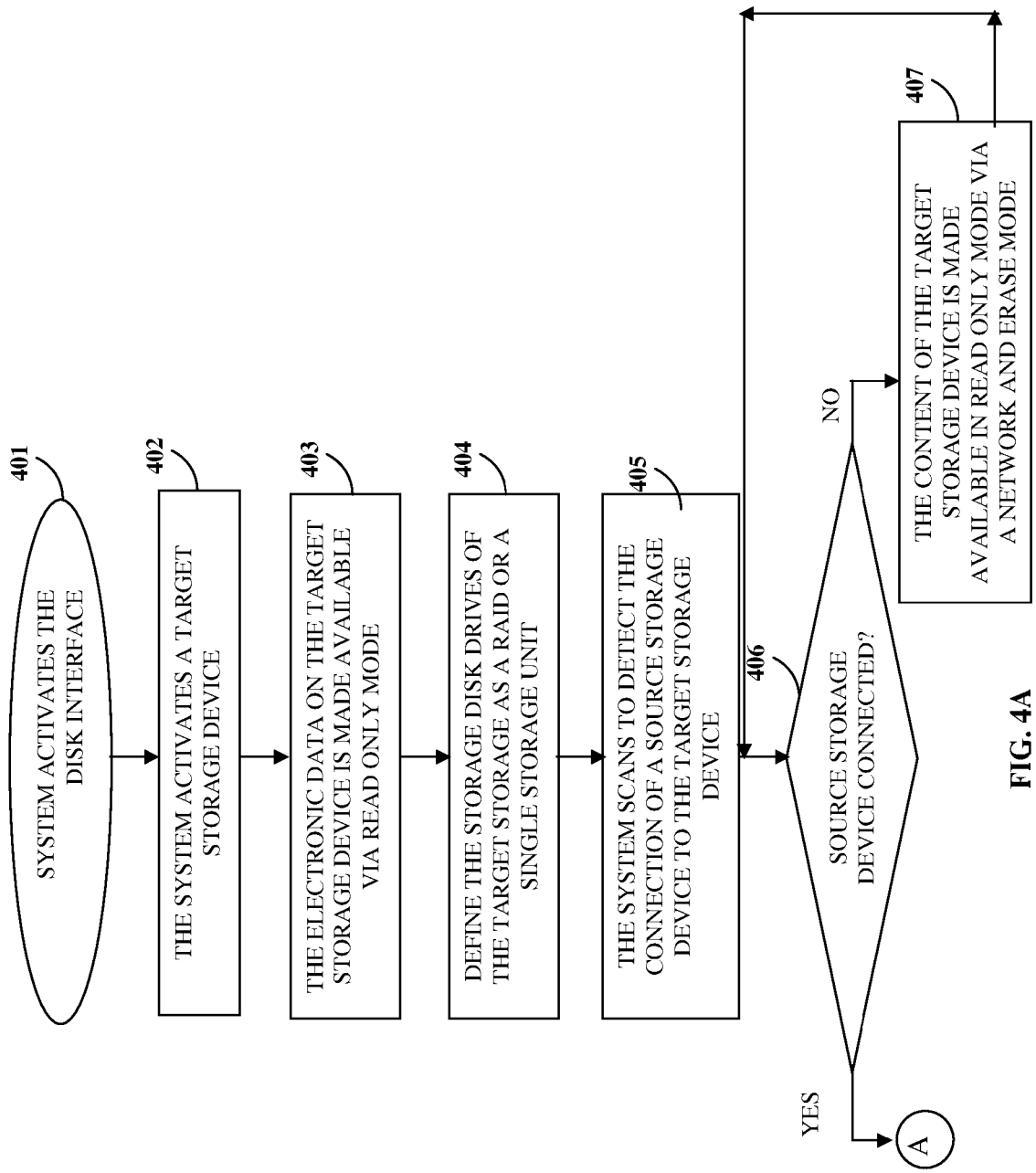
FIGS. 4A-4C exemplarily illustrate a flowchart comprising the steps of reproducing electronic data from a source storage device to a target storage device.
Figure 4B:
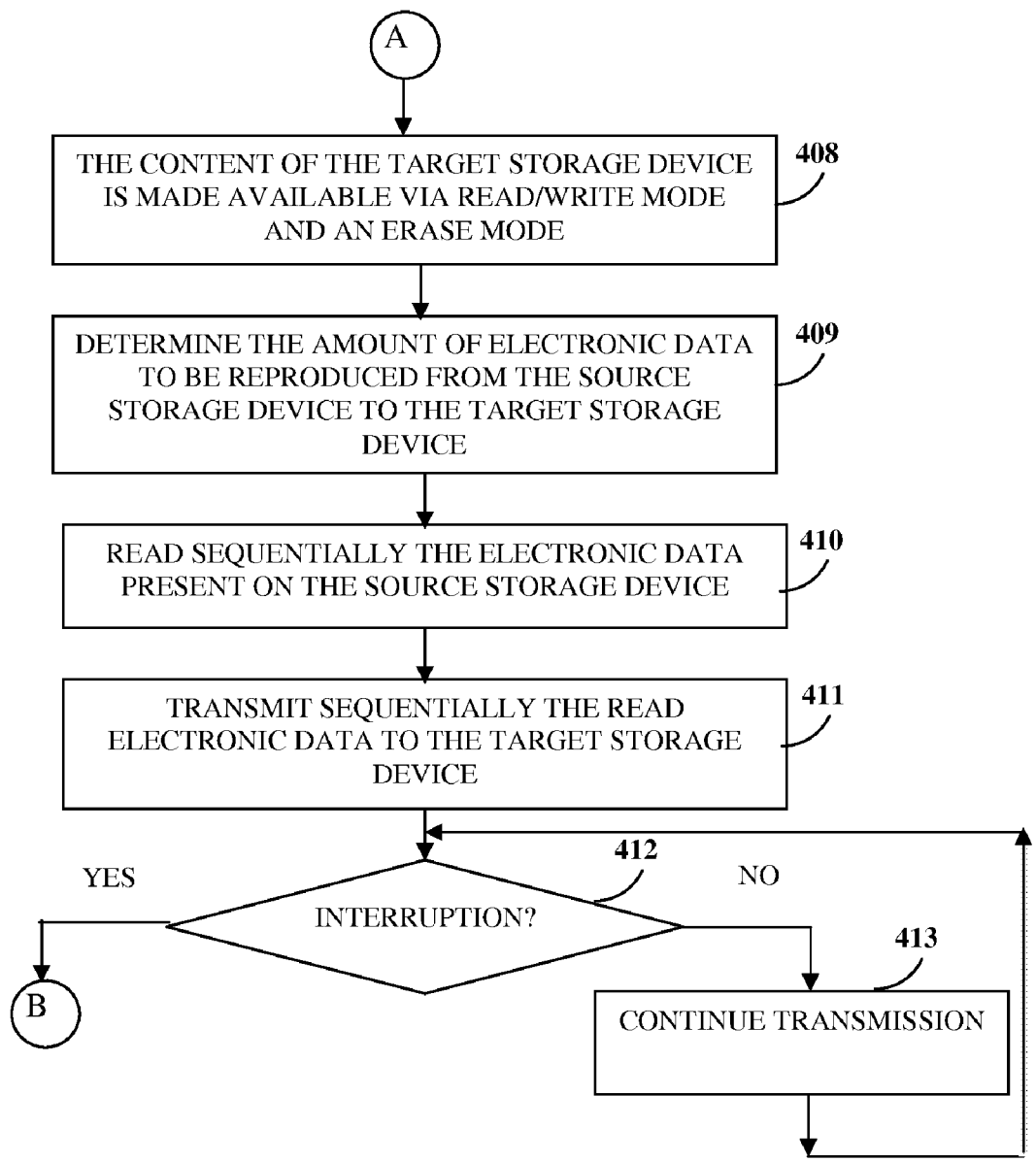
Figure 4C:
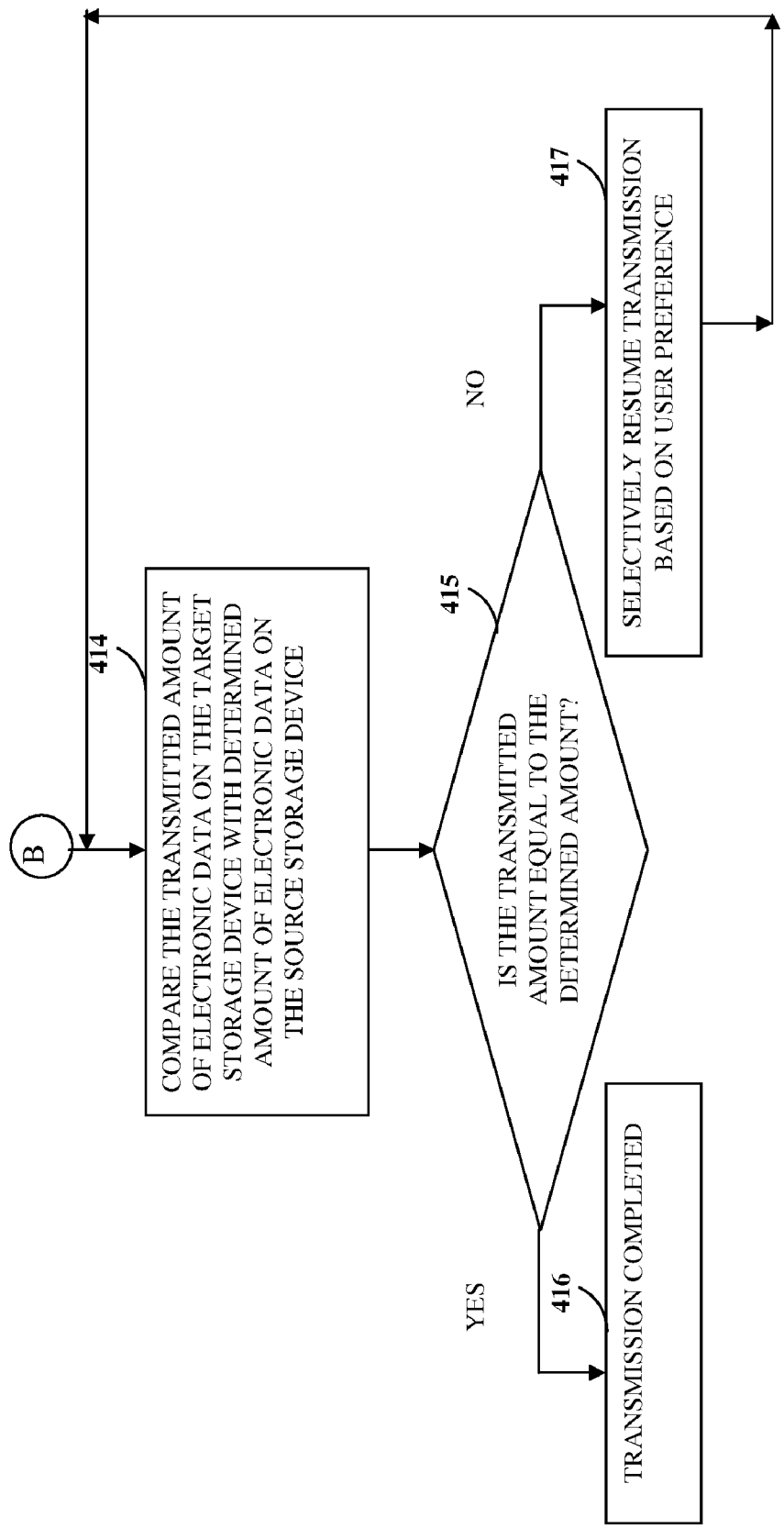

FIGS. 4A-4C exemplarily illustrate a flowchart comprising the steps of reproducing electronic data from a source storage device 209 to a target storage device 207. The computer implemented system 200 that hosts the target storage device 207 activates 401a disk interface 208. The computer implemented system 200 activates 402 the hosted target storage device 207. The computer implemented system 200 makes 403 the electronic data present on the target storage device 207 available to a user in a read only mode via the network 210. The read only mode ensures that the electronic data present on the target storage device 207 cannot be modified.

The computer implemented system 200 defines 404 the target storage device 207 as a RAID with a RAID 0 architecture or as a single storage unit.

The computer implemented system 200 scans to detect 405 the connection of a source storage device 209 to the target storage device 207. If a source storage device 209 is not connected 406 to the target storage device 207, the computer implemented system 200 makes 407 the electronic data present on the target storage device 207 available to the user in read only mode via the network 210 and an erase mode. The electronic data on the target storage device 207 is maintained as read only until a source storage device 209 is connected to the system 200.

If a source storage device 209 is connected 406 to the target storage device 207, the computer implemented system 200 makes 408 the electronic data present on the target storage device 207 available to the user in read write mode and an erase mode. The read write mode allows reproducing the electronic data from the source storage device 209 to the target storage device 207 and an erase mode allows the user to erase the reproduced electronic data from the target storage device 207.

The computer implemented system 200 then determines 409 the amount of electronic data to be reproduced from the source storage device 209 to the target storage device 207. The electronic data present on the source storage device 209 is then sequentially read 410. The read electronic data is then transmitted 411 sequentially from the source storage device 209 to the target storage device 207 by performing a sequential write operation on the read electronic data. The computer implemented system 200 monitors the electronic data transmission to track an interruption 412 during the course of the electronic data transmission.

If an interruption is identified, the computer implemented system 200 identifies the point of interruption by comparing 414 the transmitted amount of electronic data on the target storage device 207 with the determined amount of electronic data on the source storage device 209 and checks 415 if the transmitted amount of electronic data is equal to the determined amount of electronic data. If the transmitted amount of electronic data is equal to the determined amount of electronic data, the transmission is declared complete 416. If the transmitted amount of electronic data is not equal to the determined amount of electronic data, the transmission is declared incomplete and the transmission of electronic data is selectively resumed 417 based on preference of the user.

If there is no interruption, continuous transmission 413 of the electronic data takes place till the electronic data is reproduced on the target storage device 207. If an interruption occurs during the continuous transmission of the electronic data, the computer implemented system 200 identifies the point of interruption and allows the user to selectively resume the transmission of the electronic data from the source storage device 209 to the target storage device 207.

Figure 5:
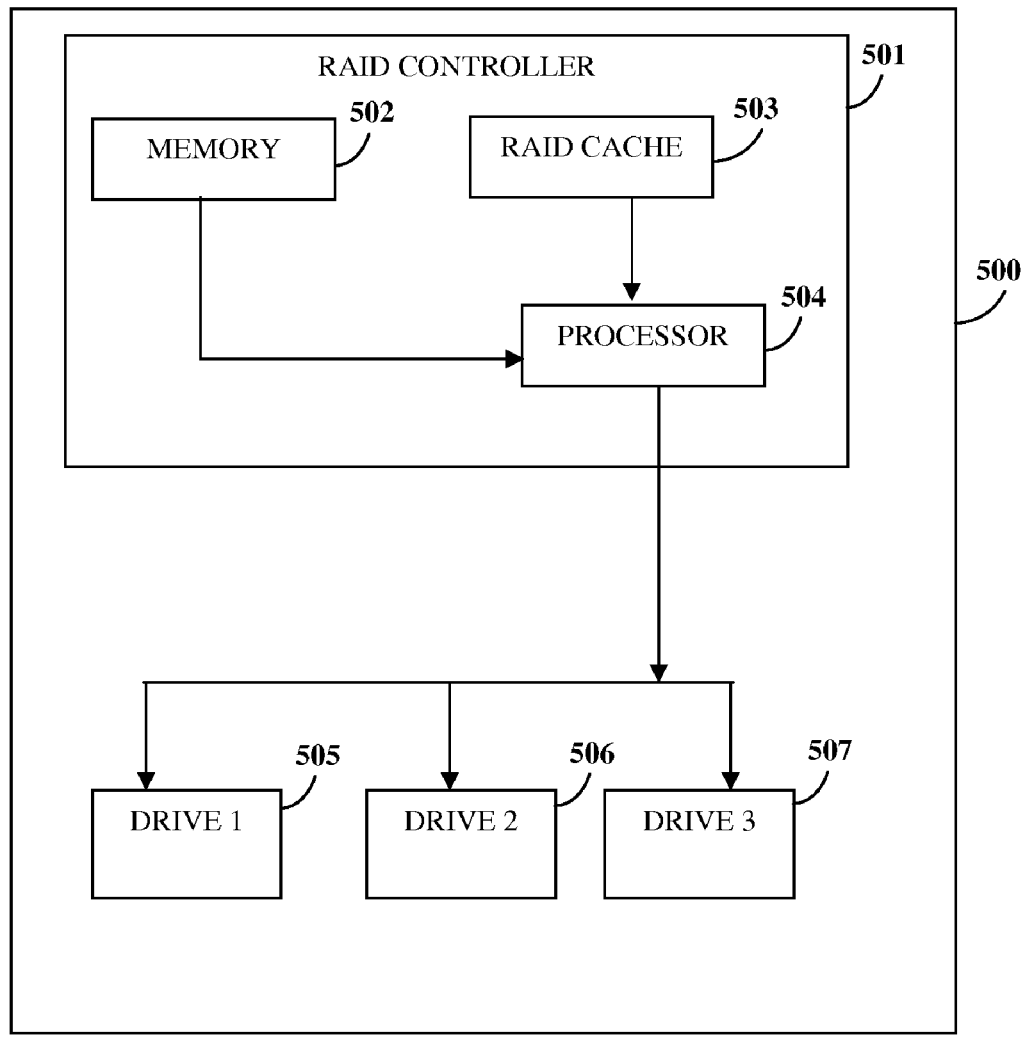
FIG. 5 exemplarily illustrates a RAID 0 architecture.

FIG. 5 exemplarily illustrates a RAID 0. The RAID 0 500 comprises a RAID controller 501, and disk drives 505, 506, and 507. The RAID controller 501 comprises processor 504, a memory 502, and a RAID cache 503. The memory 502 comprises a nonvolatile memory that stores program instructions for operating the RAID controller 501. When a user desires to access electronic data stored by one or more of the disk drives 505, 506, and 507, the electronic data is retrieved into the RAID cache 503 to facilitate quick retrieval of the electronic data. Electronic data that is transmitted from the source storage device 209 to the RAID 0 is striped and split into blocks of electronic data and is stored on the disk drives 505, 506, and 507.

Consider an example where a viewer wishes to transmit a confidential image file from a source storage device 209 herein exemplarily referred to as a "hard disk" to a target storage device 207 herein exemplarily referred to as "RAID 0". The RAID 0 is hosted on the computer implemented system 200. The computer implemented system 200 makes the electronic data present on the RAID 0 available to a user in a read only mode via the network 210. The computer implemented system 200 activates the disk interface 208 and scans to detect the attachment of the hard disk. After determining the attachment of the hard disk, the computer implemented system 200 makes the content of the RAID 0 available to a user in read write mode and erase mode. The computer implemented system 200 then determines the size of the confidential image file that has to be reproduced. The computer implemented system 200 determines that the size of the confidential image file is 2 megabytes.

The confidential image file is sequentially read and is transmitted to the RAID 0. The confidential image file is transmitted by performing a sequential write operation. The computer implemented system 200 facilitates the user to examine the read confidential image file during the course of transmission. Options are provided to the user via a GUI 206 of the computer implemented system 200 through which the user selects how the original read confidential image file is to be reproduced on the RAID 0. The user selects the option to reproduce the modified read confidential image file on the RAID 0.

An interruption occurs when 50 kilobytes of the confidential image file has already been reproduced on the RAID 0. The computer implemented system 200 performs analysis and determines the point of interruption. The user selects the option to resume the confidential image file transmission from the point at which the transmission was interrupted. The transmission is resumed and continued till the confidential image file is reproduced on the RAID 0.

If the hard disk is unavailable, the electronic data present on the target storage device 207 is made available to the user in the read only mode via the network 210.

Figure 6A:
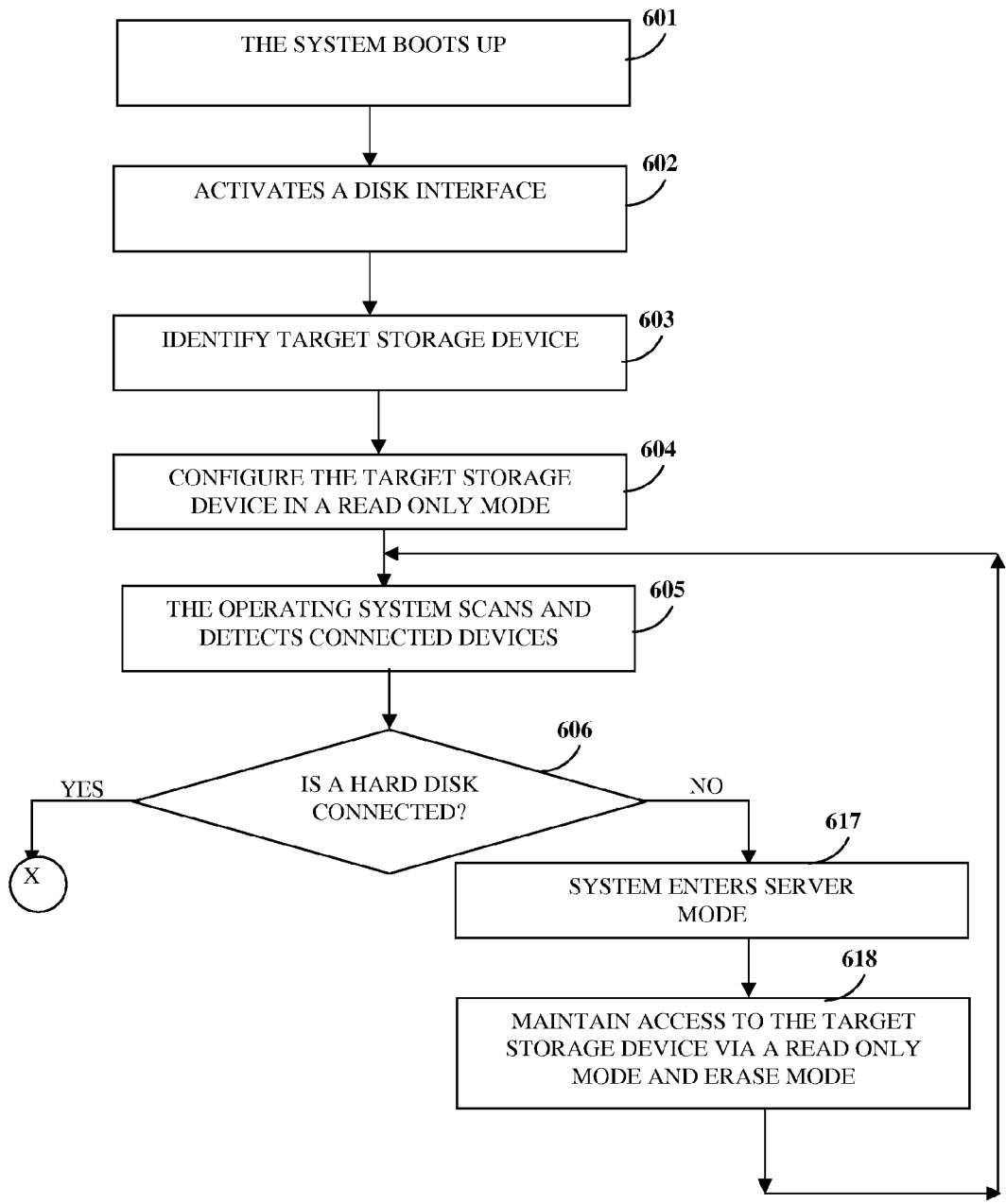
FIGS. 6A-6C exemplarily illustrate a method of selectively resuming transmission of electronic data from a source storage device to a target storage device.
Figure 6B:
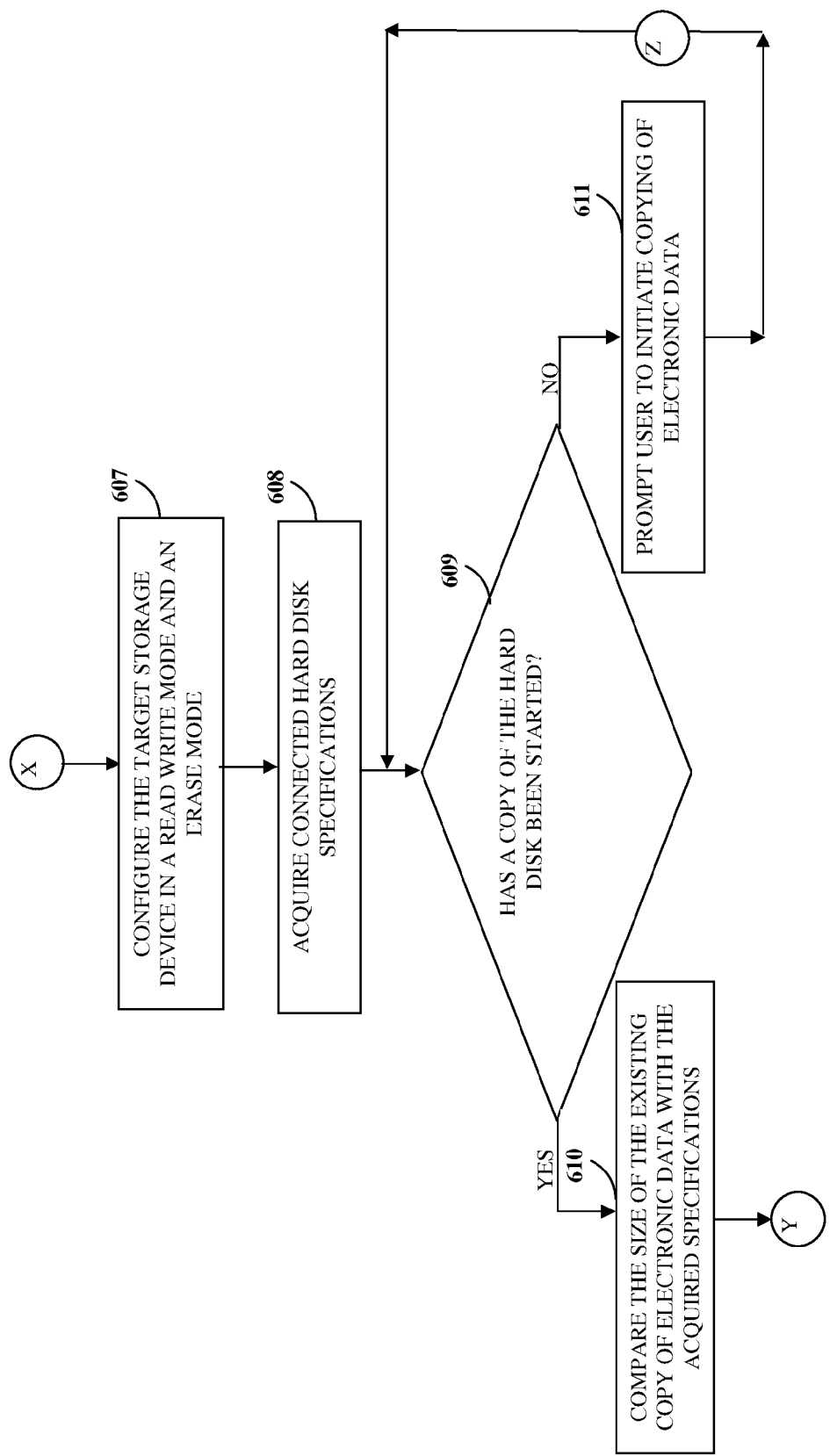
Figure 6C:
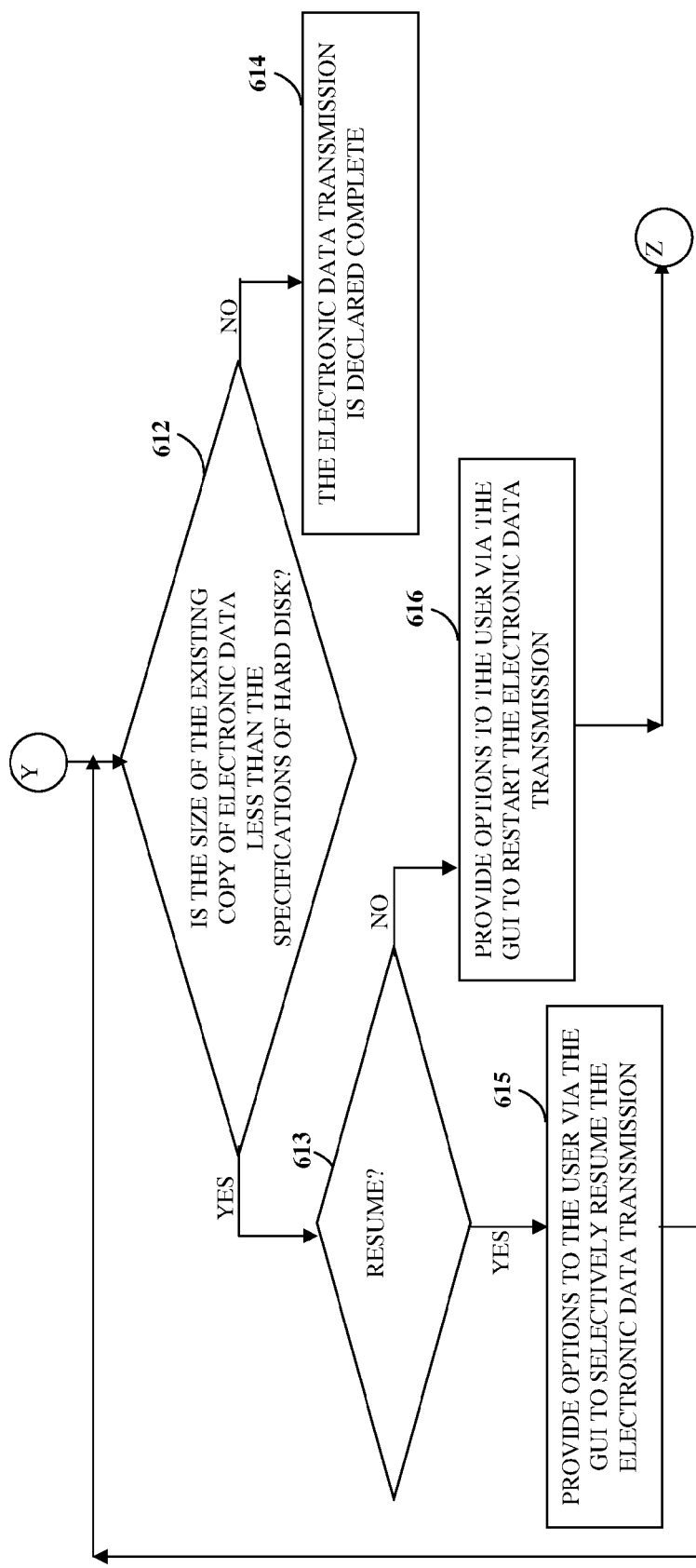

FIGS. 6A-6C exemplarily illustrate a method of selectively resuming transmission of electronic data from a source storage device 209 to a target storage device 207. Consider an example where the user wishes to reproduce electronic data present on the source storage device 209, for example, a hard disk on the target storage device 207. The computer implemented system 200 disclosed herein boots up 601. Booting of the computer implemented system 200 disclosed herein comprises a step of loading the operating system. The computer implemented system 200 activates 602 a disk interface 208 and identifies 603 a target storage device 207 that the computer implemented system 200 hosts. The target storage device 207 is now configured 604 in a read only mode and the electronic data present on the target storage device 207 is accessible to the user via a network 210. The operating system present in the computer implemented system 200 scans and determines 605 if any external devices are connected to the computer implemented system 200.

If a hard disk is not connected 606, the computer implemented system 200 enters 617 a server mode, and the computer implemented system 200 maintains 618 the access to the target storage device 207 via a read only mode and an erase mode. The user may then access the electronic data present on the target storage device 207 via the network 210.

If a hard disk is connected 606, the computer implemented system 200 configures 607 the target storage device 207 in a read write mode and an erase mode. The computer implemented system 200 acquires 608 the specifications of the connected hard disk. The specifications comprise, for example, size of source storage device 209, model number of source storage device 209, serial number of the source storage device 209, etc.

The computer implemented system 200 determines if the copy 609 of the hard disk has been started. For example, the computer implemented system 200 determines if a copy of the electronic data present on the hard disk exists on the target storage device 207. If the copy of the hard disk has not been started, the computer implemented system 200 provides 611 options to a user via the GUI 206 to initiate the copying of the electronic data. The computer implemented system 200 continues to check if a copy of the hard disk has been started.

If the copy of the hard disk has been started, the computer implemented system 200 compares 610 the size of the existing copy of electronic data present on the target storage device 207 with the acquired specifications of the hard disk. The computer implemented system 200 determines 612 if the size of the existing copy of electronic data is less than the acquired specifications of the hard disk. If the size of the existing copy of electronic data is less than the acquired specifications of the hard disk, the computer implemented system 200 prompts the user whether the user wishes to resume 613 the copying of electronic data from the hard disk to the target storage device 207.

If the user wishes to resume the copying of electronic data from the hard disk to the target storage device 207, the computer implemented system 200 provides 615 options to a user to selectively resume the copying. For example, the user can select to either resume the copying from the identified point of interruption, that is, skip bytes of electronic data present in the existing copy of the electronic data present on the target storage device 207 from the hard disk and append the remaining bytes of electronic data from the hard disk to the existing copy of electronic data present on the target storage device 207, etc., or skip additional bytes of electronic data from the source storage device 209 and only copy the electronic data of immediate requirement to the user. If the user wishes to not resume the copying of electronic data from the hard disk to the target storage device 207, the computer implemented system 200 provides 616 options to a user via the GUI 206 to restart the copying. For example, the computer implemented system 200 erases the existing copy of electronic data present on the target storage device 207 and initiates a new session of copying the electronic data from the hard disk to the target storage device 207. The computer implemented system 200 continues to check if the copy operation has been started.

If the size of the existing copy of electronic data is equal to the acquired specifications of the hard disk, the computer implemented system 200 declares 614 the transmission to be complete.

It will be readily apparent that the various methods and algorithms described herein may be implemented in a computer readable medium appropriately programmed for general purpose computers and computing devices. Typically a processor, for example, one or more microprocessors will receive instructions from a memory or like device, and execute those instructions, thereby performing one or more processes defined by those instructions. Further, programs that implement such methods and algorithms may be stored and transmitted using a variety of media, for example, computer readable media in a number of manners. The computer readable media has stored thereon multiple sequences of instructions which, when executed by a processor, cause the processor to perform the method disclosed herein. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer readable medium" refers to any medium that participates in providing data, for example instructions that may be read by a computer, a processor or a like device. Such a medium may take many forms, including but not limited to, non-volatile media, volatile media, and transmission media. Non volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer readable programs may be implemented in any programming language. Some examples of languages that can be used include C, C++, C#, or JAVA. The software programs may be stored on or in one or more mediums as an object code. A computer program product comprising computer executable instructions embodied in a computer readable medium comprises computer parsable codes for the implementation of the processes of various embodiments.

The present invention can be configured to work in a network environment including a computer that is in communication, via a communications network, with one or more devices. The computer may communicate with the devices directly or indirectly, via a wired or wireless medium such as the Internet, cellular network, satellite network, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A computer implemented method for reproducing electronic data from a source storage device to a target storage device, comprising:
   connecting said source storage device to said target storage device via a disk interface;
   determining amount of said electronic data to be reproduced from said source storage device to said target storage device;
   performing a sequential read operation on said amount of determined electronic data present on said source storage device;
   transmitting said read electronic data from said source storage device to said target storage device by performing a sequential write operation on said read electronic data from said source storage device to said target storage device, wherein said transmitted electronic data can be examined by a user during said electronic data transmission;
   monitoring and tracking said electronic data transmission from said source storage device to said target storage device;
   identifying point of interruption of said electronic data transmission by analyzing said read electronic data on said source storage device and said transmitted electronic data on said target storage device; and
   selectively resuming said electronic data transmission from said interruption based on options selected by a user; whereby said electronic data is reproduced from said source storage device to said target storage device.

2. The computer implemented method of claim 1, wherein said sequential write operation enables said read electronic data to be transmitted onto said target storage device without modifying said read electronic data on said source storage device.

3. The computer implemented method of claim 1, wherein analyzing said read electronic data comprises comparing amount of said transmitted read electronic data on said target storage device with said amount of determined electronic data to be reproduced from said source storage device to said target storage device.

4. The computer implemented method of claim 1, wherein in absence of said connection between said source storage device and said target storage device, said electronic data on said target storage device is made available in read only mode via a network.

5. A computer implemented system for reproducing electronic data from a source storage device to a target storage device, comprising:
   a disk interface that connects said source storage device to said target storage device;
   an electronic data determination module that determines amount of said electronic data to be reproduced from said source storage device to said target storage device;
   an electronic data transmission module that transmits electronic data read from said source storage device to said target storage device;
   a monitoring and tracking module that monitors and tracks said electronic data transmission from said source storage device to said target storage device;
   an interruption identification engine that identifies point of interruption of said electronic data transmission from said source storage device to said target storage device comprising:
      a comparison engine that compares amount of said transmitted electronic data on said target storage device with said determined amount of said electronic data to be reproduced from said source storage device to said target storage device;
   a transmission resume module that selectively resumes said electronic data transmission from said interruption based on options selected by a user, wherein said user selects said options on a graphical user interface; and
   said graphical user interface for enabling said user to interactively control said reproduction of said electronic data from said source storage device to said target storage device.

6. The computer implemented system of claim 5, wherein said electronic data transmission module reproduces said read electronic data on said target storage device based on preference of said user.

7. The computer implemented system of claim 5, wherein said target storage device is configured as one of a redundant array of inexpensive disks and a single storage unit.

8. The computer implemented system of claim 5, wherein said monitoring and tracking module configures said target storage device in one of a read only mode, a read write mode, and an erase mode based on type of access.

9. A computer program product comprising computer executable instructions embodied in a computer readable storage medium, wherein said computer program product comprises:
   a first computer parsable program code for determining amount of electronic data to be reproduced from a source storage device to a target storage device;
   a second computer parsable program code for performing a sequential read operation on said amount of determined electronic data present on said source storage device;
   a third computer parsable program code for performing a sequential write operation on said read electronic data from said source storage device to said target storage device for transmitting said read electronic data from said source storage device to said target storage device;
   a fourth computer parsable program code for monitoring and tracking said electronic data transmission from said source storage device to said target storage device;
   a fifth computer parsable program code for identifying point of interruption of said electronic data transmission by analyzing said read electronic data on said source storage device and said transmitted electronic data on said target storage device; and
   a sixth computer parsable program code for selectively resuming said electronic data transmission from said interruption based on options selected by a user.

10. The computer program product of claim 9, further comprising a seventh computer parsable program code for comparing amount of said transmitted read electronic data on said target storage device with said amount of determined electronic data to be reproduced from said source storage device to said target storage device.

11. The computer program product of claim 9, further comprising an eighth computer parsable program code for configuring said target storage device in one of a read only mode, a read write mode, and an erase mode based on type of access.

12. A computer implemented system for reproducing electronic data from a source storage device to a target storage device, comprising:
   a disk interface that connects said source storage device to said target storage device;
   an electronic data determination module that determines amount of said electronic data to be reproduced from said source storage device to said target storage device;

an electronic data transmission module that transmits electronic data read from said source storage device to said target storage device;
a monitoring and tracking module that monitors and tracks said electronic data transmission from said source storage device to said target storage device;
an interruption identification engine that identifies point of interruption of said electronic data transmission by analyzing said read electronic data on said source storage device and said transmitted electronic data on said target storage device;
a transmission resume module that selectively resumes said electronic data transmission from said interruption based on options selected by a user, wherein said user selects said options on a graphical user interface; and
said graphical user interface for enabling said user to interactively control said reproduction of said electronic data from said source storage device to said target storage device.

* * * * *